United States Patent [19]

Thomson et al.

[11] Patent Number: 5,751,949
[45] Date of Patent: May 12, 1998

[54] DATA SECURITY SYSTEM AND METHOD

[75] Inventors: Robert David Thomson, Colorado Springs; Roger Geiwitz, Monument, both of Colo.

[73] Assignee: MCI Corporation, Washington, D.C.

[21] Appl. No.: 447,650

[22] Filed: May 23, 1995

[51] Int. Cl.$^6$ .................................................. G06F 13/00
[52] U.S. Cl. ........................................................ 395/187.01
[58] Field of Search ............................. 395/187.01, 186, 395/188.01; 380/4, 25, 23; 364/286.4, 286.5, 286.6

[56] References Cited

U.S. PATENT DOCUMENTS

| | | | |
|---|---|---|---|
| 5,021,995 | 6/1991 | Quint et al. | 364/900 |
| 5,058,162 | 10/1991 | Santon et al. | 380/25 |
| 5,065,429 | 11/1991 | Lang | 380/25 |
| 5,182,705 | 1/1993 | Barr et al. | 364/401 |
| 5,272,628 | 12/1993 | Koss | 364/419.19 |
| 5,345,549 | 9/1994 | Appel et al. | 395/154 |
| 5,421,001 | 5/1995 | Methe | 395/500 |
| 5,440,735 | 8/1995 | Goldring | 395/600 |
| 5,483,596 | 1/1996 | Rosenow et al. | 380/25 |

*Primary Examiner*—Robert W. Beausoliel, Jr.
*Assistant Examiner*—Norman M. Wright

[57] ABSTRACT

A security system and method are provided for securing user access to server tables having data arranged in rows and columns. The server table is contained in a server computer which is accessible by a plurality of user terminals joined thereto. The server computer includes relational database software for creating and maintaining tables, including the server table, and views defining subsets of the tables. A security table is stored in the computer for identifying authorized user access to preselected rows of the server table for pre-identified users. An access view is stored in the computer for automatically joining the security and server tables to limit user access to the server table to the preselected rows thereof based on the security table. A single security table may therefore be used and is readily updated by merely deleting, adding, or updating entries.

13 Claims, 4 Drawing Sheets

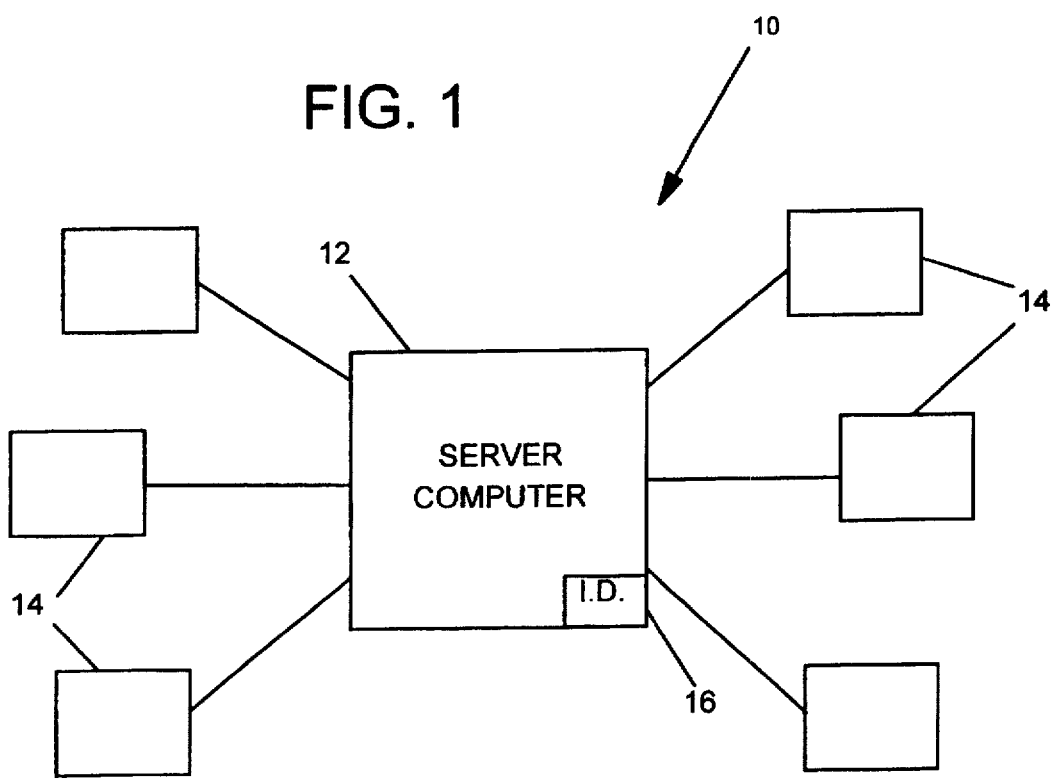

FIG. 4

| SECURITY TABLE-S | | | |
|---|---|---|---|
| USER ID | DEPT | STATE | • • • |
| 11111 | 001 | CA | XX |
| 22222 | 001 | NY | XX |
| 22222 | 002 | MA | XX |
| 11111 | 010 | TX | XX |
| 12345 | 005 | FL | XX |
| | | | |
| 11111 | 020 | NY | XX |

FIG. 5

| VIEW1 |
|---|
| SELECT * FROM TABLE1 WHERE TABLE-S.USERID= SUSER_NAME( ) AND TABLE-S.DEPT=TABLE1.DEPT |

FIG. 6

| VIEW2 |
|---|
| SELECT * FROM TABLE2 WHERE TABLE-S.USERID= SUSER_NAME( ) AND TABLE-S.STATE=TABLE2.STATE |

FIG. 7

| SAMPLE SQL QUERY | QUERY RESULTS |
|---|---|
| SELECT COLUMN1 FROM VIEW1 | COLUMN1 WILL BE RETURNED FOR EACH RECORD IN ALL DEPARTMENTS THAT THE USER HAS ACCESS TO BASED ON THE TABLE-S AUTHORIZATION. |
| SELECT COLUMN1, COLUMN2 FROM VIEW1 WHERE DEPT - '001' | BOTH COLUMNS WILL BE RETURNED FOR RECORDS IN DEPARTMENT 001 IF THE USER HAS A RECORD IN TABLE-S AUTHORIZING THE USE OF DEPT 001. |
| SELECT * FROM VIEW1 WHERE DEPT - '001' OR DEPT - '002' | ALL COLUMNS WILL BE RETURNED FOR RECORDS IN DEPARTMENTS 001 OR 002 IF THE USER HAS AUTHORIZING RECORDS FOR BOTH DEPARTMENTS IN TABLE-S. IF THE USER IS ONLY AUTHORIZED FOR ONE OF THE TWO DEPARTMENTS, THE RESULTS WILL ONLY CONTAIN THE SINGLE DEPARTMENT. |

DATA SECURITY SYSTEM AND METHOD

BACKGROUND OF THE INVENTION

The present invention relates generally to computer accessed databases, and, more specifically, to a security system for limiting access to the database to authorized users.

Computer accessible databases are well known and typically configure data in tables having rows and columns. A typical server computer system includes a central server computer with many remote terminals operatively joined thereto, with each terminal typically being in the form of a personal computer with its own monitor, keyboard, and central processing unit (CPU). Clients or users utilize the remote terminals to access the server computer for various purposes including accessing databases therein for in turn manipulating the data as desired. The server computer is maintained by one or more administrators who configure and maintain the various databases for use by the various users at the remote terminals. And, the server computer utilizes appropriate software or programs to accomplish this.

In one exemplary embodiment, the server computer includes conventional relational database software stored therein which is used by an administrator for creating and maintaining databases including various server or data tables. An exemplary relational database software is known as standard query language (SQL) Server software and is commercially available from the Sybase Company, of Denver, Colo. for example. The Sybase SQL Server software is merely representative of existing or developed software having built in capabilities for creating and maintaining databases, and inherent limitations as well.

For example, the relational database software is preconfigured for effecting security of the data contained in the various data or server tables thereof in horizontal or vertical manners. A typical server table includes a limited number of data columns in the vertical direction typically limited by the relevant number of pertinent attributes concerning the data. The number of corresponding horizontal rows of the table is usually unlimited, and is typically substantially greater in number than the number of columns. Recognizing the need to provide security to the various data tables as desired, the relational database software is provided with suitable software to limit access to entire server tables to authorized users, as well as limiting access to selected rows or columns of individual tables to authorized users.

In order to limit user access to one or more of the table columns, the relational database software allows an administrator to create using predefined software syntax one or more subsets of the tables known generally as views. In this way, the various users at the remote terminals may only access authorized data columns through predefined views, which is typically implemented by matching a user's log-on (logon) identification (ID) number with a user ID stored in a corresponding system table in the server computer. Since there are a finite, reasonable number of table columns in typical databases, creating a specific view for the corresponding authorized columns is readily accomplished for securing access to these columns.

However, in order to effect horizontal or row security in the server tables, the same security tool requires that an individual view be effected by the administrator for each horizontal slice or row of a given server table. If the number of rows is reasonably small, this security tool is readily implemented. A significant problem occurs when there are a substantial number of horizontal data slices, for example a thousand or more, since the available security method would in turn require the administrator to generate a corresponding number of views, a thousand or more, to implement the row security. Furthermore, if the row security parameters require frequent changing, then corresponding views must also be created and entered into the database before the new security can be utilized, which makes the data unavailable for the corresponding time required to implement the security change. It is desirable to improve the ease of effecting security, in particular row security, with a minimum amount of effort and time to implement, and eliminate unavailable down-time for accessing the data in the server tables.

SUMMARY OF THE INVENTION

A security system and method are provided for securing user access to server tables having data arranged in rows and columns. The server table is contained in a server computer which is accessible by a plurality of user terminals joined thereto. The server computer includes relational database software for creating and maintaining tables, including the server table, and views defining subsets of the tables. A security table is stored in the computer for identifying authorized user access to preselected rows of the server table for pre-identified users. An access view is stored in the computer for automatically joining the security and server tables to limit user access to the server table to the preselected rows thereof based on the security table. A single security table may therefore be used and is readily updated by merely deleting, adding, or updating entries.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 1 is a schematic representation of a plurality of remote user terminals operatively joined to a server computer containing a database with a plurality of server tables having data arranged in rows and columns.

FIG. 2 is an exemplary server table containing data arranged in rows and columns stored within the server computer illustrated in FIG. 1.

FIG. 4 is an exemplary embodiment of the security table illustrated in FIG. 3 containing rows of user ID's and authorized row access to the server tables illustrated In FIG. 3.

FIG. 5 is an exemplary view of software syntax for joining the security table of FIG. 4 to the first server table illustrated in FIGS. 2 and 3 to effect row security thereof.

FIG. 6 is an exemplary second view of software syntax for joining the security table of FIG. 4 with the second server table of FIG. 3 to effect row security based on another row label.

FIG. 7 is a table of sample Standard Query Language (SQL) queries provided to the server computer in FIG. 1 through the various remote terminals, with the corresponding query results therefor.

DESCRIPTION OF THE PREFERRED EMBODIMENT(S)

Figure 3:
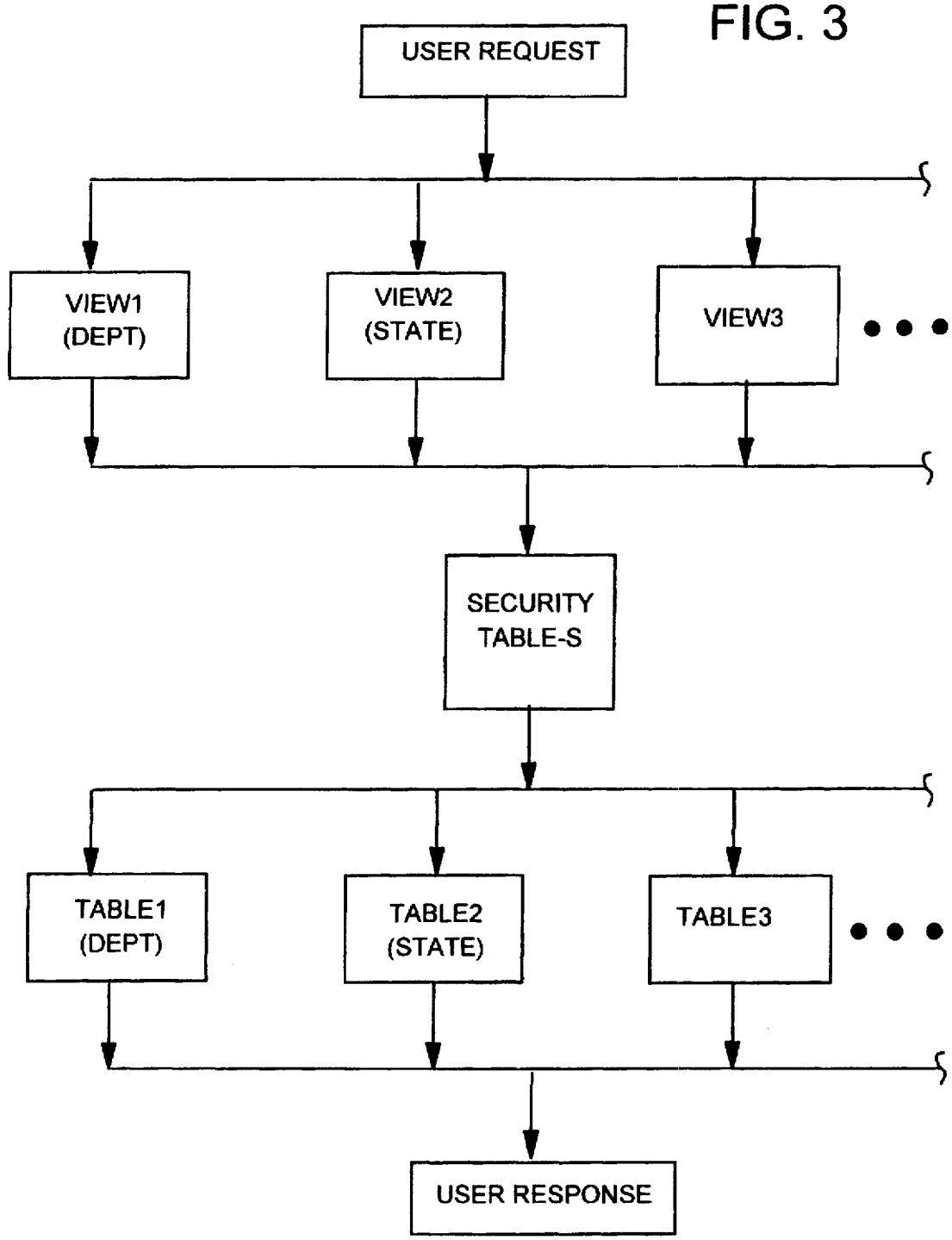
FIG. 3 is a flow chart representation of a user request for data sent to the server computer illustrated in FIG. 1 showing access to a plurality of server tables like the one illustrated in FIG. 2 through a corresponding plurality of access views and a common security table.

Illustrated schematically in FIG. 1 is an exemplary database server system 10 which includes a central server computer 12 and a plurality of conventional remote user input/output terminals 14 operatively joined thereto in a conventionally known manner for providing access thereto. The server computer 12 may take any conventional form and includes a digital, programmable central processing unit (CPU) and one or more conventional memory or storage devices. The user terminals 14 may also take any conventional form such as a personal computer including an output monitor, an input keyboard, its own CPU, and its own memory storage device as required.

The server computer 12 is conventionally configured with a preexisting relational database software suitably stored in the computer 12. An exemplary relational database software is conventionally known as the Sybase SQL Server software which is a commercially available product from the Sybase Company of Denver, Colo. for example. The relational database software is stored in the server computer 12 and is conventionally operable by an administrator for creating and maintaining a database including tables, with an exemplary table being referred to as a data or server table having data prearranged in horizontal rows and vertical columns. The relational database software also includes conventional views which define subsets of one or more of these server tables, which views are implemented using a preexisting software syntax for the corresponding relational database software. Since various relational database software is available, various syntax is associated therewith, with the corresponding views nevertheless being definable by the administrator to define data subsets as desired.

In the exemplary Sybase SQL Server software, a preexisting security system is provided therein. The security system may be configured by the administrator to limit user access to entire tables or portions thereof based on a suitable user identification (ID) such as a single, multi-digit number (e.g. 12345) for example. In order to create security for a given data partition such as one or more rows or columns of a given server table, the administrator creates a specific view for each such data partition giving access thereto to specified users by their corresponding user ID's. In a practical application, a server table includes a reasonably small number of columns, and providing vertical for one or more of the columns is readily accomplished by creating the corresponding views.

However, the number of rows in an exemplary server table is substantially greater than the number of columns and may for example be up to three or more orders of magnitude greater, with the corresponding number of data partitions being equally as large. For a one thousand row server table, up to one thousand views would be required to implement horizontal row security using the preexisting relational database software. However this presents an administrative burden and is time consuming. Furthermore, if the row security needs to change frequently, then new views need to be created by the administrator and entered into the database before the new security can be effected, which then prevents the data from being available by the users for the time required to implement the security.

In accordance with the present invention, the existing relational database software may be used in a new manner to substantially simplify the creation of row security in the server tables thereof. The improved security system in accordance with the present invention includes the existing server computer 12 shown in FIG. 1, the existing relational database software contained therein, and the existing user terminals 14. An exemplary first server TABLE1 stored in the database of the server computer 12 illustrated in FIG. 1 is illustrated in FIG. 2. This exemplary server table includes data arranged in rows and columns of any desired length, with the number of rows typically being substantially larger than the number of columns, for example three or more orders of magnitude greater. In TABLE1 each of the various rows has a corresponding row label, which in this exemplary embodiment identifies various departments (Dept's) by a corresponding multiple digit number. For each of the row labels, there are one or more columns of useful data indicated generically by various combinations of the letters X and Y, with the data taking any suitable form as desired such as alphabetic, numeric, or alphanumeric. For example, the data contained in the various columns might represent sensitive financial data for the corresponding departments, with it being desired to limit user access to the data in TABLE1 on a selected need-to-know basis.

Accordingly, in order to readily implement row security of the TABLE1 a single Security TABLE-S is created by the administrator and stored in the server computer 12 for identifying authorized user access to preselected rows of the server TABLE1 for pre-identified users as illustrated in FIG. 3. In addition, a suitable access view, such as first VIEW1 is created by the administrator and is also stored in the server computer 12 for automatically joining the Security TABLE-S and the corresponding server table such as TABLE1 to limit user access to the server table to solely preselected rows thereof based on the Security TABLE-S.

Referring firstly to FIG. 4, an exemplary Security TABLE-S is illustrated and includes a first column of preselected user ID's and one or more corresponding columns of authorized-access row labels for the respective user ID's. For example, each of the users is given a corresponding user ID which may take any suitable form including the multi digit numbers illustrated in FIG. 4. When a user logs on to one of the remote terminals illustrated in FIG. 1, the user ID must be entered and is conventionally stored in a system table 16 in the server computer 12 in a conventionally known manner. In this way a preselected user ID is associated with a given user. And, as shown in FIG. 2, a row label (e.g. Dept.number) is associated with or defines each row of the server TABLE1. The Security TABLE-S is therefore used to join given or identified users as identified by their ID's to the authorized row labels in the server TABLE1.

The Security TABLE-S may include as many row entries as desired for linking user ID's to desired row labels, such as the Dept. numbers found in TABLE1. As indicated for example in Security TABLE-S, one or more user ID rows may be provided for a given user ID to correspond with one or more authorized row labels such as Dept. number. User ID 11111 is listed in the Security TABLE-S as having authorized access to Dept. Nos. 001, 010, and 020 for example. User ID 22222 is authorized for access to Dept. Nos. 001 and 002.

The Security TABLE-S provides a simple security list based on user ID's and row labels which is implemented in accordance with the present invention using one or more predefined views having suitable relational database syntax for allowing access to the server TABLE1 by the user solely through the access view itself and based on the Security TABLE-S. FIG. 5 illustrates an exemplary first VIEW1 in conventional Sybase relational database server syntax which creates a subset from TABLE1 based on the Security TABLE-S to allow user access to authorized rows of the server TABLE1 based on the user ID's and row labels. The first access VIEW1 illustrated in FIG. 5 provides the syntax configuration to allow row access to the server TABLE1 where both an authorized-access row label and user ID is contained in the Security TABLE-S for the given user. Paraphrasing the syntax of the first VIEW1, a user operating a remote terminal 14 in FIG. 1 will be allowed access to the first server TABLE1 through the first VIEW1 which selects from the TABLE1 where the Security TABLE-S user ID is equal to the user name as represented by the user logon ID, in conjunction with the Security TABLE-S row label such as Dept. number where it is equal to the server TABLE1 row label. For example, since the TABLE-S allows access to Dept. Nos. 001, 010, and 020, to user ID 11111, the first VIEW1 operates with the server TABLE1 to allow access to each row label number 001, 010, and 020 entry and its corresponding data columns found therein. The Security TABLE-S need only include a single record per row label per user ID which results in a relatively simple security table. The Security TABLE-S may therefore simply include duplicate or multiple user ID's as shown in FIG. 4 with different row labels therefor, respectively. The Security TABLE-S may be readily or dynamically updated by the administrator by simply changing, adding, or deleting rows therein containing the user ID and respective row label entry or record. In this way, the various users at the remote terminals 14 may continue to access the various server tables such as TABLE1 with minimal or no interruption, since updating of the Security TABLE-S merely involves simple row by row entries into that existing table.

Referring again to FIG. 3, a typical user request for data is represented in flow chart form for obtaining access to authorized rows in various ones of server tables contained in the server computer 12 of FIG. 1. In a practical application, there are a plurality of different server tables as illustrated in FIG. 3, with each server table containing data in row and column form in a manner identical to the first server TABLE1 illustrated in FIG. 2. The various server tables may be conventionally configured to have different column data for similar row labels, or different row labels and corresponding column entries. In the exemplary first TABLE1 illustrated in FIG. 2, column data is provided for a given row label representing different departments (Dept.).

The second server TABLE2 illustrated in FIG. 3 is substantially identical to the server TABLE1 illustrated in FIG. 2 except that the row labels thereof are different and indicate for example a different classification such as one of the U.S. States. Since the state row label associated with server TABLE2 is different than the Dept. row label associated with server TABLE1, a correspondingly different second VIEW2 is created therefor. A common, single Security TABLE-S may correspondingly be used to provide secured access to the various server tables by having a corresponding number of data columns therein for the different row labels of server TABLE1 and TABLE2 corresponding to respective user ID's. As shown in FIG. 4 for example, user ID 11111 has authorized access to the specified departments, and authorized access to data in server TABLE2 for the exemplary states indicated by the two letter abbreviation CA, TX, and NY. A corresponding VIEW2 is required for joining the security TABLE-S with the corresponding server TABLE2 and is illustrated in FIG. 6 with an exemplary syntax. The second VIEW2 illustrates in FIG. 6 is substantially identical to the first VIEW1 illustrated in FIG. 1 except that the row label in VIEW2 is the "state" as identified by the two letter abbreviation, whereas the row label utilized in the first VIEW1 is the "Dept" indicated by its corresponding reference number.

As shown in FIG. 3, a plurality of different server tables are indicated, along with a respective plurality of the views allowing row access to each of the server tables based on a respective one of the views configured specifically therefor. In the exemplary embodiment illustrated in FIG. 3, the first VIEW1 is specifically configured for the Dept. TABLE1, and the second VIEW2 is specifically configured for the state TABLE2. Upon matching of a user's log-on ID with the stored user ID's contained in the Security TABLE-S, the corresponding views allow indirect access to the corresponding server tables for the authorized row therein which provides simple and effective security using standard tools which preexist in the relational database software contained in the server computer 12. No program changes are required in the relational database software itself, but improved and simplified security is nevertheless available.

The relational database software contained in the server computer 12 is conventionally configured to allow direct user read access solely to the various views and the Security TABLE-S, with no direct user access to the server tables themselves, which are maintained by the administrator. Access to the server tables is provided solely through the various views and therefore row security is easily and effectively implemented without major work or modification of the preexisting relational database software itself.

The security system of the present invention is effected by an administrator using the available tools in the existing relational database software in the server computer 12. As is conventionally known, the clients or users at the remote terminals 14 have limited access to the tools available in the relational database software in the server computer 12. Various electronic spreadsheet software and/or report generation software is typically used in the various remote terminals 14 to actually access and manipulate the various databases in the server computer 12 in a conventional fashion and are conventionally compatible with the relational database software itself. Since the remote terminals 14 access data from the server computer 12 using conventional tables and views allowed in the relational database software, the security system of the present invention is effectively invisible to the end user.

FIG. 7 illustrates sample relational database (SQL) queries which may be made from any one of the remote terminals 14 by an end user or client. These sample queries are associated with the exemplary first TABLE1 illustrated in FIG. 2. In conventional fashion, the first query in suitable syntax requests column I data from VIEW1, with the user access to the first server TABLE1 being processed through the flow chart illustrated in FIG. 3 to return the data record in all departments that the user has access based on the Security TABLE-S authorization.

In the second query illustrated in FIG. 7, the user requests column 1 and 2 records from the first VIEW1 for a specific department such as "001." Both columns will be returned to the remote terminal 14 for records in Dept. "001" if the user has a record in the Security TABLE-S authorizing the use of Dept. "001." And in the third query illustrated in FIG. 7, the user requests data records from the first VIEW1 for Depts. "001" and "002." All records will be returned for these two Depts. if the user has authorization for both Depts. in the Security TABLE-S. If the user is authorized only for one of the two Depts., the access will be limited to that single authorized Dept.

The security system and method disclosed above therefore provide improved row security with a single Security TABLE-S, with a single view per serving table for providing access thereto. This substantially simplifies existing security procedures available in the existing relational database software, and correspondingly reduces administration efforts while allowing dynamic and quick changes in the Security TABLE-S for minimizing or preventing interruption or downtime in the various databases contained in the server computer 12. If column security is also desired, the standard or existing procedure for effecting column security available in the relational database software may be utilized for creating corresponding views in a conventional manner. In this way both row and column security may be implemented using existing relational database software tools If desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A security system for providing user authorized access to a server table having data arranged in rows and columns comprising:

a server computer for storing said server table;

a plurality of user terminals operatively joined to said computer for providing access to said server table;

relational database software stored in said computer and operable by an administrator for creating and maintaining tables, including said server table, and views defining subsets of said tables;

a security table stored in said computer for identifying authorized user access to preselected rows of said server table for pre-identified users; and an access view stored in said computer for joining said security and server tables to limit user access to said server table to said preselected rows thereof based on said security table.

2. A security system according to claim 1 further comprising:

a preselected user identification ID associated with a given user;

a row label associated with each row of said server table; and wherein:

said security table includes a column of preselected user ID's and a corresponding column of authorized-access row labels for said user ID's, respectively; and said access view is configured to allow user access to authorized rows of said server table based on said user ID's and row labels.

3. A security system according to claim 2 further comprising a plurality of said server tables and a respective plurality of said views for allowing row access to each of said server tables based on a respective one of said views configured therefor.

4. A security system according to claim 3 wherein:

said server tables have different row labels;

said security table includes a plurality of columns for said different row labels corresponding to said user ID's; and said views are configured for respective ones of said row labels.

5. A security system according to claim 3 wherein said security table includes a single record per row label per user ID.

6. A security system according to claim 5 wherein said security table includes duplicate user ID's with different row labels, respectively.

7. A security system according to claim 3 wherein said relational database software is configured to allow user read access solely to said views and said security table, and no direct access to said server tables.

8. A method of securing access to a server table having data arranged in rows and columns and stored in a server computer configured with relational database software for creating and maintaining tables, including said server table, and views defining subsets of said tables, said method comprising:

creating a security table in said computer for authorizing user access to preselected rows of said server table for pre-identified users; and creating an access view in said computer for automatically joining said security table and said server table to limit user access to said server table to preselected rows thereof based on said security table.

9. A method according to claim 8 further comprising allowing user access to said server table solely through said access view.

10. A method according to claim 9 further comprising:

providing a preselected user ID associated with a given user;

providing a row label associated with each row of said server table;

providing in said server table a column of preselected user ID's and a corresponding column of authorized-access row labels for said user ID's, respectively; and providing in said access view authorization to allow user access to authorized rows of said server table based on said user ID's and row labels.

11. A method according to claim 10 wherein said security table includes a single record per row label per user ID.

12. A method according to claim 11 wherein said security table includes duplicate user ID's with different row labels, respectively.

13. A method according to claim 12 further comprising updating said security table by adding or deleting user ID and respective row label entries therein.

* * * * *